(12) United States Patent
Kawamura et al.

(10) Patent No.: US 9,792,189 B2
(45) Date of Patent: Oct. 17, 2017

(54) SERVER SYSTEM, COMPUTER SYSTEM, METHOD FOR MANAGING SERVER SYSTEM, AND COMPUTER-READABLE STORAGE MEDIUM

(71) Applicant: HITACHI, LTD., Tokyo (JP)

(72) Inventors: Tetsuo Kawamura, Tokyo (JP); Shunji Umehara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 238 days.

(21) Appl. No.: 14/777,883

(22) PCT Filed: Sep. 12, 2013

(86) PCT No.: PCT/JP2013/074725
§ 371 (c)(1),
(2) Date: Sep. 17, 2015

(87) PCT Pub. No.: WO2015/037103
PCT Pub. Date: Mar. 19, 2015

(65) Prior Publication Data
US 2016/0266987 A1    Sep. 15, 2016

(51) Int. Cl.
*G06F 11/00* (2006.01)
*G06F 11/20* (2006.01)
*G06F 11/07* (2006.01)

(52) U.S. Cl.
CPC ........ *G06F 11/2033* (2013.01); *G06F 11/076* (2013.01); *G06F 11/0709* (2013.01); *G06F 11/2025* (2013.01); *G06F 11/2035* (2013.01); *G06F 11/2048* (2013.01); *G06F 2201/805* (2013.01)

(58) Field of Classification Search
CPC ............ G06F 11/2023; G06F 11/2025; G06F 11/2028; G06F 11/2033; G06F 11/2048
See application file for complete search history.

(56) References Cited

U.S. PATENT DOCUMENTS

2008/0091746 A1* 4/2008 Hatasaki ............. G06F 11/2033
2008/0294933 A1   11/2008 Nishii et al.
(Continued)

FOREIGN PATENT DOCUMENTS

JP    2008-293245 A    12/2008

*Primary Examiner* — Michael Maskulinski
(74) *Attorney, Agent, or Firm* — Volpe and Koenig, P.C.

(57) ABSTRACT

In a server system, a hardware configuration comparison is made with respect to each combination of a current server and a backup server, and, by referring to hardware configuration matching policy information, the presence or absence of hardware configuration concealment and the possibility of a take-over are determined with respect to each combination of the current server and the backup server. In addition, with respect to each combination of the current server and the backup server, a configuration matching rate indicating the ratio of hardware configuration matching is calculated. Based on information about the presence or absence of hardware configuration concealment, information about the possibility of a take-over, and information about the configuration matching rate with respect to each combination of the current server and the backup server, the backup server as a take-over destination of the current server is allocated.

14 Claims, 12 Drawing Sheets

(56) References Cited

U.S. PATENT DOCUMENTS

| | | | | |
|---|---|---|---|---|
| 2009/0307166 A1* | 12/2009 | Routray | ................... | G06N 5/04 |
| | | | | 706/46 |
| 2010/0138686 A1* | 6/2010 | Arata | .................. | G06F 11/2025 |
| | | | | 714/4.1 |
| 2010/0146327 A1* | 6/2010 | Takubo | ............... | G06F 11/2025 |
| | | | | 714/4.1 |
| 2011/0307735 A1* | 12/2011 | Greenberg | .......... | G06F 11/3051 |
| | | | | 714/5.1 |

* cited by examiner

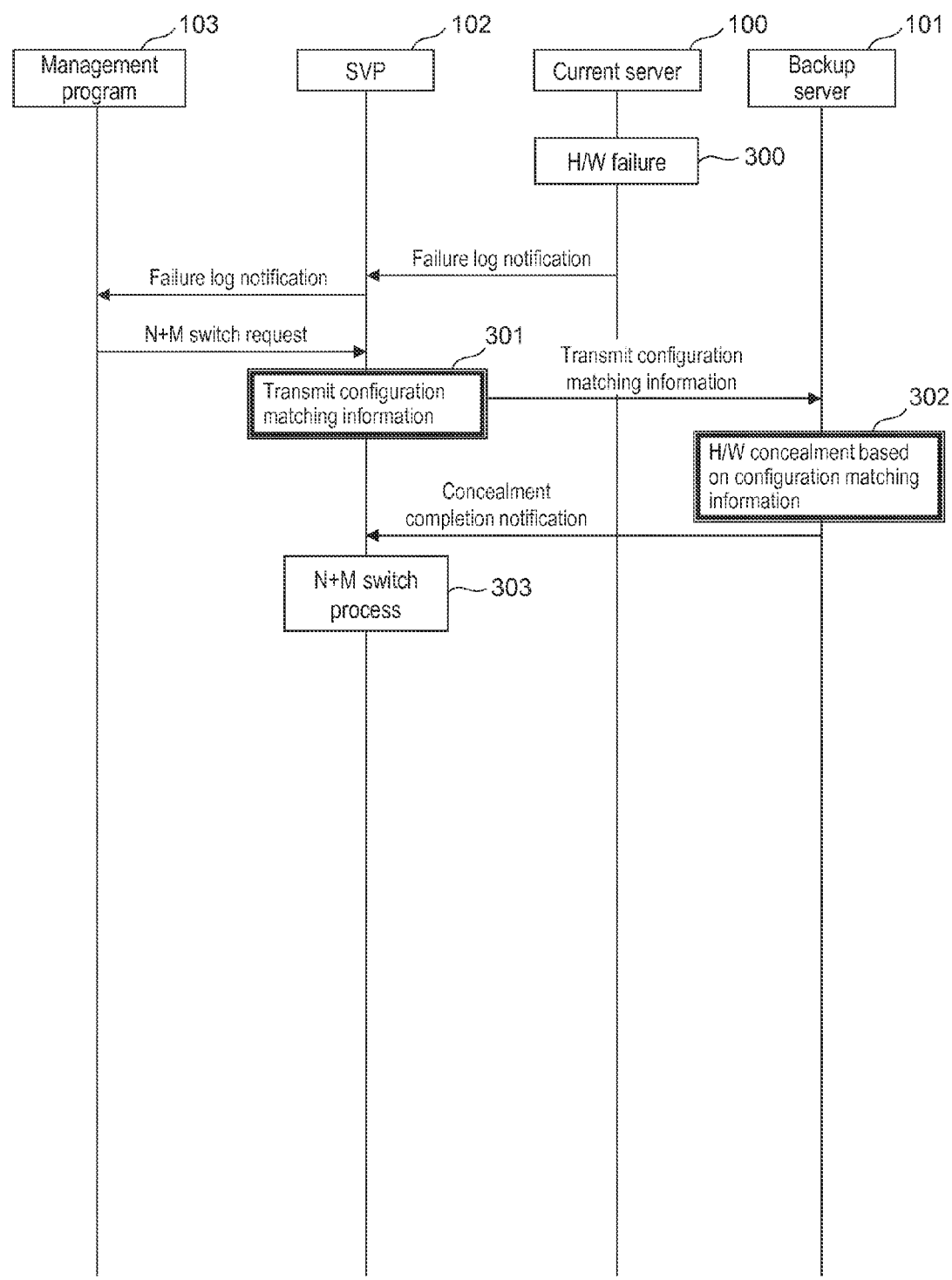

FIG. 4

| | H/W configuration table | | | | | | |
|---|---|---|---|---|---|---|---|
| Server name | Server 1 | Server 2 | Server 3 | Server 4 | Server 5 | Server 6 | Server 7 |
| Use | Backup | Backup | Current | Current | Current | Current | Current |
| Module name | Mount information | | | | | | |
| CPU socket 0 | Mounted | Mounted | Mounted | Mounted | Mounted | Mounted | Mounted |
| Frequency | 3.0 | 2.0 | 2.0 | 2.0 | 2.0 | 2.0 | 3.0 |
| CPU socket 1 | Mounted | Mounted | Mounted | Mounted | Mounted | Mounted | Mounted |
| Frequency | 3.0 | 2.0 | 2.0 | 2.0 | 2.0 | 2.0 | 3.0 |
| CPU socket 2 | Not-mounted | Not-mounted | Not-mounted | Mounted | Mounted | Not-mounted | Not-mounted |
| Frequency | - | - | - | 2.0 | 2.0 | - | - |
| CPU socket 3 | Not-mounted | Not-mounted | Not-mounted | Mounted | Mounted | Not-mounted | Not-mounted |
| Frequency | - | - | - | 2.0 | 2.0 | - | - |
| CPU core 0-0 | Mounted | Mounted | Mounted | Mounted | Mounted | Mounted | Mounted |
| CPU core 0-1 | Mounted | Mounted | Mounted | Mounted | Mounted | Mounted | Mounted |
| CPU core 0-2 | Mounted | Mounted | Not-mounted | Mounted | Not-mounted | Not-mounted | Mounted |
| CPU core 0-3 | Mounted | Mounted | Not-mounted | Mounted | Not-mounted | Not-mounted | Mounted |
| CPU core 1-0 | Mounted | Mounted | Mounted | Mounted | Mounted | Mounted | Mounted |
| CPU core 1-1 | Mounted | Mounted | Mounted | Mounted | Mounted | Mounted | Mounted |
| CPU core 1-2 | Mounted | Mounted | Not-mounted | Mounted | Not-mounted | Not-mounted | Mounted |
| CPU core 1-3 | Mounted | Mounted | Not-mounted | Mounted | Not-mounted | Not-mounted | Mounted |
| CPU core 2-0 | Not-mounted | Not-mounted | Not-mounted | Mounted | Mounted | Not-mounted | Not-mounted |
| CPU core 2-1 | Not-mounted | Not-mounted | Not-mounted | Mounted | Mounted | Not-mounted | Not-mounted |
| CPU core 2-2 | Not-mounted | Not-mounted | Not-mounted | Mounted | Not-mounted | Not-mounted | Not-mounted |
| CPU core 2-3 | Not-mounted | Not-mounted | Not-mounted | Mounted | Not-mounted | Not-mounted | Not-mounted |
| CPU core 3-0 | Not-mounted | Not-mounted | Not-mounted | Mounted | Mounted | Not-mounted | Not-mounted |
| CPU core 3-1 | Not-mounted | Not-mounted | Not-mounted | Mounted | Mounted | Not-mounted | Not-mounted |
| CPU core 3-2 | Not-mounted | Not-mounted | Not-mounted | Mounted | Not-mounted | Not-mounted | Not-mounted |
| CPU core 3-3 | Not-mounted | Not-mounted | Not-mounted | Mounted | Not-mounted | Not-mounted | Not-mounted |
| Total number of cores | 8 | 8 | 4 | 16 | 8 | 4 | 8 |
| DIMM0 | Mounted | Mounted | Mounted | Mounted | Mounted | Mounted | Mounted |
| Capacity | 4 | 8 | 4 | 4 | 4 | 8 | 4 |
| DIMM1 | Mounted | Mounted | Mounted | Not-mounted | Mounted | Mounted | Mounted |
| Capacity | 4 | 8 | 4 | -- | 4 | 8 | 4 |
| I/O slot 0 | Mounted | Mounted | Mounted | Mounted | Mounted | Not-mounted | Mounted |
| I/O slot 1 | Mounted | Not-mounted | Not-mounted | Not-mounted | Not-mounted | Not-mounted | Not-mounted |
| I/O slot 2 | Not-mounted | Mounted | Not-mounted | Not-mounted | Not-mounted | Mounted | Not-mounted |

FIG. 5

| H/W configuration matching policy |||||||
|---|---|---|---|---|---|---|
| Current server name | 3 | 4 | 5 | 6 | 7 ||
| Module name | Policy | Policy | Policy | Policy | Policy ||
| CPU socket | No concealment | No concealment | No concealment | Configuration matching | No concealment |
| CPU core | No concealment | No concealment | No concealment | Configuration matching | No concealment |
| DIMM | Configuration matching | No concealment | No concealment | Configuration matching | No concealment |
| I/O slot | Configuration matching | Configuration matching | Configuration matching | Configuration matching | Configuration matching |

FIG. 7

| | Configuration matching information table | | | | | | |
|---|---|---|---|---|---|---|---|
| 700 | | | | | | | |
| 701 Current/Backup | 3/1 | 4/1 | 5/1 | 6/1 | 7/1 | 3/2 | 4/2 |
| Module name | Concealment information | | | | | | |
| 702 CPU socket 0 | No concealment | No concealment | No concealment | No concealment | No concealment | No concealment | ... |
| CPU socket 1 | No concealment | No concealment | No concealment | No concealment | No concealment | No concealment | |
| CPU socket 2 | No concealment | No concealment | No concealment | No concealment | No concealment | No concealment | |
| CPU socket 3 | No concealment | No concealment | No concealment | No concealment | No concealment | No concealment | |
| Average frequency increase rate | 1.5 | 1.5 | 1.5 | 1.5 | 1.5 | 1.0 | |
| 703 CPU core 0-0 | No concealment | No concealment | No concealment | No concealment | No concealment | No concealment | ... |
| CPU core 0-1 | No concealment | No concealment | No concealment | No concealment | No concealment | No concealment | |
| CPU core 0-2 | No concealment | No concealment | No concealment | No concealment | No concealment | No concealment | |
| CPU core 0-3 | No concealment | No concealment | No concealment | No concealment | No concealment | No concealment | |
| CPU core 1-0 | No concealment | No concealment | No concealment | No concealment | No concealment | No concealment | |
| CPU core 1-1 | No concealment | No concealment | No concealment | No concealment | No concealment | No concealment | |
| CPU core 1-2 | No concealment | No concealment | No concealment | No concealment | No concealment | No concealment | |
| CPU core 1-3 | No concealment | No concealment | No concealment | No concealment | No concealment | No concealment | |
| CPU core 2-0 | No concealment | No concealment | No concealment | No concealment | No concealment | No concealment | |
| CPU core 2-1 | No concealment | No concealment | No concealment | No concealment | No concealment | No concealment | |
| CPU core 2-2 | No concealment | No concealment | No concealment | No concealment | No concealment | No concealment | |
| CPU core 2-3 | No concealment | No concealment | No concealment | No concealment | No concealment | No concealment | |
| CPU core 3-0 | No concealment | No concealment | No concealment | No concealment | No concealment | No concealment | |
| CPU core 3-1 | No concealment | No concealment | No concealment | No concealment | No concealment | No concealment | |
| CPU core 3-2 | No concealment | No concealment | No concealment | No concealment | No concealment | No concealment | |
| CPU core 3-3 | No concealment | No concealment | No concealment | No concealment | No concealment | No concealment | |
| CPU core number increase rate | 1 | 0.5 | 1 | 2 | 1 | 1 | |
| 704 DIMM0 | No concealment | No concealment | No concealment | No concealment | No concealment | No concealment | ... |
| DIMM1 | No concealment | No concealment | No concealment | No concealment | No concealment | No concealment | |
| Memory capacity increase rate | 1.0 | 2.0 | 1.0 | 1.0 | 1.0 | 2.0 | |
| 705 I/O slot 0 | No concealment | No concealment | No concealment | Take-over impossible | No concealment | No concealment | ... |
| I/O slot 1 | Concealment | Concealment | Concealment | | Concealment | No concealment | |
| I/O slot 2 | No concealment | No concealment | No concealment | | No concealment | Concealment | |

FIG. 9

| | | | \multicolumn{5}{c|}{Current server} | |
|---|---|---|---|---|---|---|---|---|
| | | | 3 | 4 | 5 | 6 | 7 | Yes-total |
| 901 Take-over possibility | Backup server | 1 | YES | YES | YES | NO | YES | 4 |
| | | 2 | YES | YES | YES | YES | YES | 5 |
| 903 Number of take-over destination candidates | | | 2 | 2 | 2 | 1 | 2 | |
| 904 Number of concealed modules | Backup server | 1 | 1 | 1 | 1 | — | 1 | |
| | | 2 | 1 | 1 | 1 | 2 | 1 | |
| 905 Average CPU frequency increase rate | Backup server | 1 | 1.5 | 1.5 | 1.5 | — | 1.0 | |
| | | 2 | 1.0 | 1.0 | 1.0 | 1.0 | 0.66 | |
| 906 CPU core number increase rate | Backup server | 1 | 2.0 | 0.5 | 1.0 | — | 1.0 | |
| | | 2 | 2.0 | 0.5 | 1.0 | 2.0 | 1.0 | |
| 907 Memory capacity increase rate | Backup server | 1 | 2.0 | 1.0 | 1.0 | — | 1.0 | |
| | | 2 | 2.0 | 4.0 | 2.0 | 1.0 | 2.0 | |
| 908 H/W configuration matching rate | Backup server | 1 | 66 | 33 | 44 | — | 66 | |
| | | 2 | 44 | 44 | 22 | 66 | 44 | |
| 909 Number of ECC errors | | | 0 | 0 | 60 | 0 | 80 | |
| 910 Availability factor | | | 90 | 50 | 50 | 50 | 30 | |

Allocation determination information table — 902

FIG. 10

| Allocation modifying policy | | |
|---|---|---|
| Priority | Policy | |
| 1 | If there are un-allocated current servers with the number of ECC errors exceeding 50, implement the following allocation for the servers with ECC errors exceeding 50 in order of decreasing number of ECC errors:<br>(1) Allocate to backup server with the smallest total number of ECC errors in allocation table. If total number of ECC errors is same, implement (2).<br>(2) Allocate to backup server with the smallest total number of "yes" for take-over destination candidate in allocation determination information table. | 1002 |
| 2 | If availability factor exceeds 90%, allocate backup server with the CPU core increase rate of 2.0 or more. If the rate is same, make no allocation. | 1003 |
| 3 | Allocate to backup server with highest CPU core number increase rate. If the rate is same, make no allocation. | 1004 |
| 4 | Allocate to backup server with smallest number of concealed modules. | 1005 |

| Allocation modifying policy | | |
|---|---|---|
| Priority | Policy | |
| 1 | If there are un-allocated current servers with the number of ECC errors exceeding 50, implement the following allocation for the servers with ECC errors exceeding 50 in order of decreasing number of ECC errors:<br>(1) Allocate to backup server with the smallest total number of ECC errors in allocation table. If total number of ECC errors is same, implement (2).<br>(2) Allocate to backup server with the smallest total number of "yes" for take-over destination candidate in allocation determination information table. | 1100 |
| 2 | Implement the following process for un-allocated current servers in order of increasing server numbers until there is no more candidates:<br>(1) Allocate to backup server with the smallest number of allocated servers in allocation table. If the number of allocations is same, or no allocation can be made, implement (2).<br>(2) Allocate to backup server with the smallest total number of ECC errors. If the rate is the same, implement (3).<br>(3) Allocate to allocation-enabled backup server with the smallest server name. | 1101 |

Allocation table

| 1300 | | | Current server | | | | | ECC error total | Number of allocated servers |
|---|---|---|---|---|---|---|---|---|---|
| | | | 3 | 4 | 5 | 6 | 7 | | |
| Allocation | Backup server | 1 | O | | O | - | O | 140 | 3 |
| | | 2 | | O | | O | | 0 | 2 |

FIG. 14

Allocation table

| 1300 | | | Current server | | | | | ECC error total | Number of allocated servers |
|---|---|---|---|---|---|---|---|---|---|
| | | | 3 | 4 | 5 | 6 | 7 | | |
| Allocation | Backup server | 1 | | O | | - | O | 80 | 2 |
| | | 2 | O | | O | O | | 60 | 3 |

FIG. 15

Allocation table

| 1300 | | | Current server | | | | | ECC error total | Number of allocated servers |
|---|---|---|---|---|---|---|---|---|---|
| | | | 3 | 4 | 5 | 6 | 7 | | |
| Allocation | Backup server | 1 | O | | | - | O | 80 | 2 |
| | | 2 | | O | O | O | | 60 | 3 |

US 9,792,189 B2

SERVER SYSTEM, COMPUTER SYSTEM, METHOD FOR MANAGING SERVER SYSTEM, AND COMPUTER-READABLE STORAGE MEDIUM

TECHNICAL FIELD

The present invention relates to a server system, a computer system, a method for managing a server system, and a computer-readable storage medium, and relates to, for example, a technology for replacing a server experiencing a failure in a computer system so as to recover the server from the failure.

BACKGROUND ART

In a computer system provided with a plurality of servers, if a failure develops in a server performing an operation (current server), the operation being performed in the current server may be taken over by a backup server so as to increase the availability of the computer system.

An example of such take-over method is a failure recovery method whereby a boot disk (logic unit) having been utilized by the current server experiencing a failure is started up by a backup server running no operation, so that the operation of the current server can be taken over by the backup server. In this method, when there is a plurality of current servers in the computer system, failure recovery is possible no matter which current server fails. Accordingly, high reliability can be obtained by preparing a small number of backup servers for a large number of current servers.

In this method, since the setting of an OS for performing an operation at the time of take-over is minimized, it is preferable to minimize the difference in hardware (H/W) configuration before and after the take-over if high reliability is to be obtained. Particularly, if the H/W configuration is greatly different, take-over may become impossible. In order to eliminate the take-over impossibility, it is necessary to design a dedicated system or OS so that the OS can normally operate even when the H/W configuration is different.

Further, because there are many constraints to physical H/W configuration, in order to match physical computer configurations, it is generally necessary to prepare a computer with an identical H/W configuration. To address such situation, a method may involve constructing a virtual computer, as described in Patent Literature 1. By providing the virtual computer with the identical configuration, the problem of take-over inability due to a different physical configuration is solved.

CITATION LIST

Patent Literature

Patent Literature 1: JP 2008-293245 A

SUMMARY OF INVENTION

Technical Problem

However, when the method according to Patent Literature 1 is used, take-over from a physical computer to a virtual computer cannot be performed. Thus, when the current server is a physical computer in the system being run, the server cannot be taken over by the method of Patent Literature 1.

Accordingly, during take-over from a physical computer, it is necessary to enable taking over to a physical computer having a different H/W configuration by matching a physical configuration recognized on software with regard to a portion for which H/W configuration matching is required.

However, performing the take-over while only considering the configuration matching may result in an inefficient take-over of H/W resources.

In addition, when server take-over is performed in the case of a different H/W configuration, the following problem may be caused. For one thing, if the I/O configuration is different, the I/O boot order may be changed before and after the take-over, whereby a logic unit may not be correctly read, resulting in a failure to start the OS. Even if the OS starts up, an I/O recognition work in accordance with the number of I/O's maybe required on the OS. In addition, if the number of sockets of a CPU core or the number of cores is increased, software licensing constraints may be encountered.

In a conventional computer system configuration, due to the absence of difference information of H/W that can be concealed or a lack of mechanism for concealment for configuration matching, a H/W concealing process for configuration matching cannot be mechanically executed. Further, in the case of simple configuration matching involving physical configuration matching for a take-over, as described above, H/W resources may not be fully utilized, resulting in an inefficient take-over. If a take-over is performed by concealing the server having an unmatched configuration for configuration matching instead of using a server with an inherently matching configuration, wasteful H/W resources may arise compared with the case of taking over to the server with the matching configuration. In addition, if there is a concentration of current servers that can be taken over to a single backup server, if one server is taken over through configuration matching, the other current servers cannot be taken over.

The present invention was made in view of the above circumstance, and provides a technology for implementing a take-over that takes the state of other current servers into consideration so as to efficiently utilize H/W resources.

Solution to Problem

In order to solve the problem, according to the present invention, a take-over to a physical computer is implemented by making physical configurations recognized on software identical with respect to a portion in which the H/W configurations need to be identical between the current server and the backup server.

More specifically, a server system according to the present invention includes at least one current server that processes an operation and that is running; at least one backup server prepared to take over the operation of the current server when the current server fails; and a local management computer that monitors the current server and the backup server and that controls server switching. The local management computer includes a processor that executes a process of allocating the backup server as a take-over destination for the operation of the current server, and a memory that stores at least one piece of hardware configuration matching policy information indicating a hardware configuration condition enabling a server take-over. The processor of the local management computer executes a process of acquiring hardware configuration information of each of the current server and the backup server therefrom, a process of making a hardware configuration comparison based on the acquired hardware configuration information with respect to each combination of the current server and the backup server, and determining a presence or absence of hardware configuration concealment and the possibility of a take-over with respect to each combination of the current server and the backup server by referring to the hardware configuration matching policy information read from the memory, a process of calculating a configuration matching rate indicating the ratio of hardware configuration matching with respect to each combination of the current server and the backup server, and a process of allocating the backup server as the take-over destination of the current server on the basis of information about the presence or absence of hardware configuration concealment, information about the possibility of a take-over, and information about the configuration matching rate with respect to each combination of the current server and the backup server.

Additional features relating to the present invention will become apparent from the following description of the present specification and the attached drawings. Various aspects of the present invention are achieved and implemented by elements and various combinations of the elements described in the following detailed description and set forth in the appended claims.

It should be understood that the descriptions in the present specification are merely illustrative and do not limit the range of the claims or the application examples in any sense.

Advantageous Effects of Invention

According to the present invention, a take-over from one current server to a backup server can be executed while taking the state of other current servers into consideration and efficiently utilizing H/W resources.

BRIEF DESCRIPTION OF DRAWINGS

FIG. 3 is a diagram for describing a procedure for switching from a current server to a backup server in the event of failure.

FIG. 4 is a diagram showing a configuration example of a H/W configuration table indicating concealable H/W information.

FIG. 5 shows a configuration example of a H/W configuration matching policy table indicating policies for H/W configuration matching.

FIG. 7 shows a configuration example of a configuration matching information table generated by the H/W configuration matching process.

FIG. 9 shows a configuration example of an allocation determination information table obtained by the allocation determination information table updating process.

FIG. 10 shows a configuration example (1) of a current server allocation modifying policy.

FIG. 11 shows a configuration example (2) of the current server allocation modifying policy.

FIG. 13 shows an example of a newly created (initialized) allocation table.

FIG. 14 shows an example of an allocation table obtained through allocation modification using the allocation modifying policy of FIG. 10.

FIG. 15 shows an example of an allocation table obtained through allocation modification using the allocation modifying policy of FIG. 11.

DESCRIPTION OF EMBODIMENTS

In the following, embodiments of the present invention will be described with reference to the attached drawings. In the attached drawings, functionally similar elements may be indicated by similar numerals. While the attached drawings illustrate specific embodiments and implementation examples in conformity with the principle of the present invention, these are intended for facilitating an understanding of the present invention, and are not to be taken for interpreting the present invention in a limited sense.

While the embodiments are described in sufficient detail to enable to those skilled in the art to practice the invention, it is to be understood that other implementations or aspects are also possible and that various configurational or structural changes and substitutions of various elements may be made without departing from the technical scope and spirit of the present invention. The following description is, therefore, not to be taken in a limited sense.

In addition, the embodiments of the present invention may be implemented either by software executed on a general-purpose computer, by a dedicated hardware, or by a combination of software and hardware, as will be described later.

While in the following description, various information concerning the present invention will be described in the form of "tables", the information is not necessarily required to be expressed in the data structure of a table, and may be instead expressed in data structures including but not limited to a list, a DB, a queue and the like. Thus, a table, a list, a DB, a queue and the like may be simply referred to as "information" so as to indicate the absence of data structure dependency.

When the content of information is described, expressions such as "identification information", "identifier", "name", "designation", and "ID" may be used, and the expressions may be substituted with one another.

In the following, various processes according to embodiments of the present invention will be described with reference to various control units as the subject (operating entity). However, the operation of the various control units may be described as a program, where the program may be executed by a processor so as to perform a certain process using a memory and a communication port (communication control device). Thus, the description may be made with reference to the processor as the subject. With respect to a process executed by a program in cooperation with a processor, the program may be partly or entirely implemented by dedicated hardware or in the form of modules. Various programs may be installed via a program distribution server or a storage medium.

<Computer System Configuration>

Figure 1:
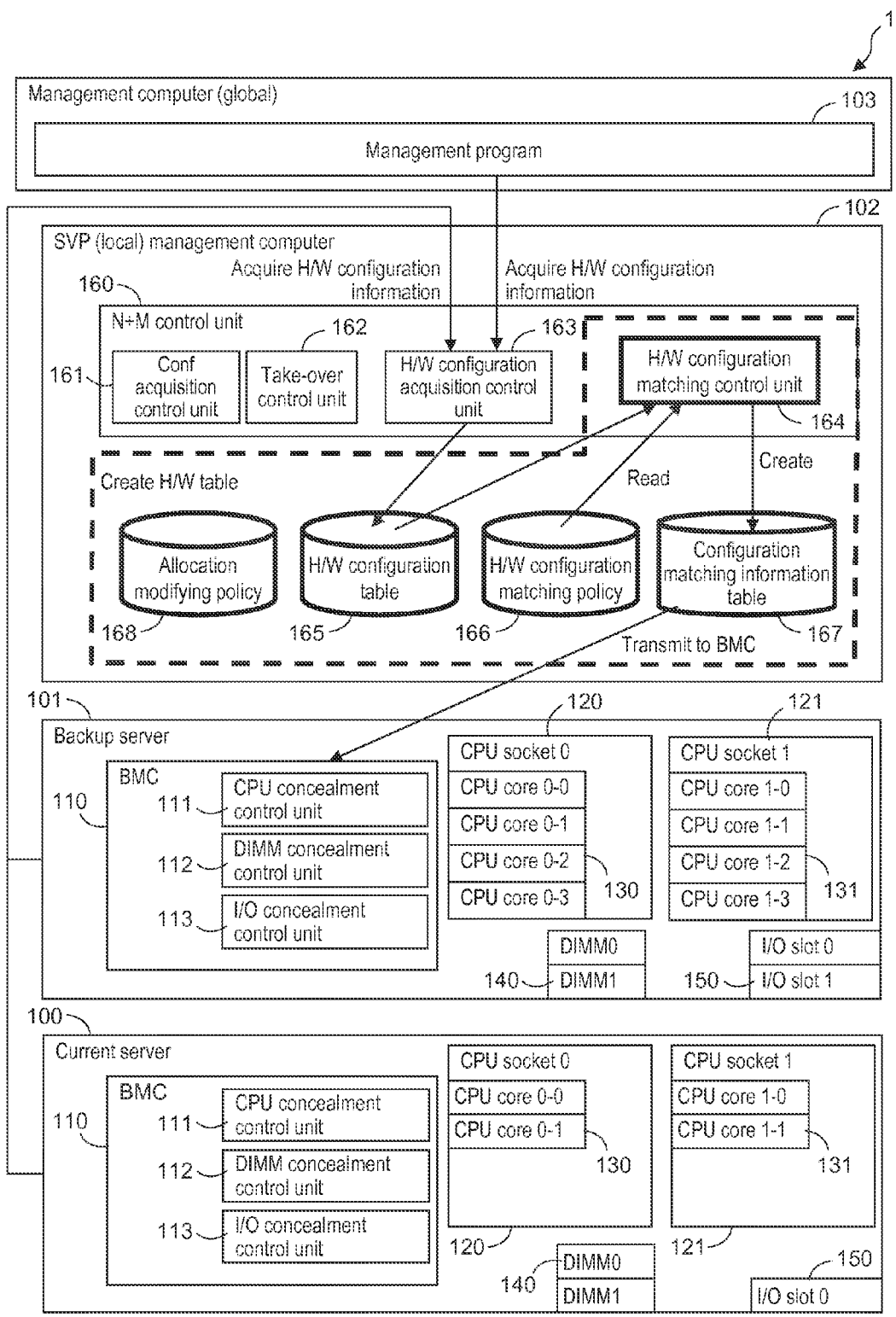
FIG. 1 is a block diagram of an overall configuration example of a computer system 1 according to an embodiment of the present invention.

FIG. 1 is a block diagram of an overall configuration of a computer system according to an embodiment of the present invention. The computer system 1 includes a current server 100 operating as a currently active server; a backup server 101 that takes over the operation of the current server when the current server has failed; a Service Processor (SVP) 102 (which may also be referred to as a local management computer) that monitors the current server 100 and the backup server 101; and a management computer (global management computer) including a management program 103 for monitoring the current server 100, the backup server 101, and the SVP 102 in the computer system 1. The current server 100, the backup server 101, and the SVP 102 constitute a single blade server housed in a single chassis, for example. The management program 103 of the management computer (global management computer) monitors the operations of the current server 100, the backup server 101, and the SVP 102 across a plurality of blade servers.

The current server 100 and the backup server 101 include a Baseboard. Management Controller (BMC) 110, CPU sockets 120 and 121, CPU cores 130 and 131, Dual Inline Memory Modules (DIMM) 140, and I/O slots 150. The BMC 110 includes a CPU concealment control unit 111, a DIMM concealment control unit 112, and an I/O concealment control unit 113. The control units may be configured by a program, as described above.

The SVP 102 includes an N+M control unit 160 which is a control unit for taking over an operation; a H/W configuration table 165 (see FIG. 4) having H/W configuration information; a H/W configuration matching policy storage unit (storage region) 166 (see FIG. 5) that defines policies for H/W (Hardware) configuration matching; a configuration matching information table 167 (see FIG. 7) including backup server setting information for matching the configurations of the current server and the backup server; and an allocation modifying policy storage unit (storage region) 168 (see FIG. 10 or 11) storing allocation modifying policy. The "N" of the N+M control unit 160 indicates the number of current servers, and "M" indicates the number of backup servers. The N+M control unit 160 may simply be referred to as a "control unit".

The N+M control unit 160 includes a Conf acquisition control unit 161 that acquires setting information (information of the BMC of each server) necessary for a take-over; a take-over control unit 162 that controls server switching; a H/W configuration acquisition control 163 that acquires concealable H/W information of a server; and a H/W configuration matching control unit 164 that creates information for matching the H/W configurations of the current server and the backup server and transmits the information to the BMC 110. The control units may be configured by a program, as described above.

The current server 100 is a server in which an OS is started and an operation is being run. The backup server 101 is a stand-by server for taking over the operation when the current server fails. The backup server 101 may have a different H/W configuration from the current server and is not necessarily required to be running. While the modules of the current server and the backup server according to the present embodiment are the CPUs 120-121, the DIMM 140, and the I/O slot 150, any type of module may be used as long as the BMC 110 has concealment control and is capable of module concealment.

The H/W configuration acquisition control unit 163 of the N+M control unit 160 of the SVP 102 acquires H/W configuration information from the current server 100, the backup server 101, and the management program 103, and creates the H/W configuration table 165. The acquired H/W configuration information is H/W information necessary for determining and executing H/W reduction (concealment) and PCI slot blocking, for example. In the present embodiment, the server system (system unit: blade server) mounting the current server 100, the backup server 101, and the SVP 102 is described. However, it is also possible to execute a take-over process using the current server 100 and the backup server 101 of another system unit (a blade server in a separate chassis) via the management program 103.

The H/W configuration matching control unit 163 reads the H/W configuration table 165 and the H/W configuration matching policy 165 indicating a configuration matching reference for the current server 100 and the backup server 101. Based on the information that has been read, the H/W configuration matching control unit 163 creates the configuration matching information table 167 including the setting information for matching the configurations of the current server 100 and the backup server 101.

The H/W configuration matching control unit 163 also transmits the configuration matching information in the configuration matching information table 167 to the BMC 110 of the backup server 101. The BMC 110, based on the received configuration matching information, performs concealment control so as to match the H/W configurations of the current server 100 and the backup server 101. With the H/W configurations of the current server 100 and the backup server 101 matched, an operation take-over process is executed. However, there are cases where a take-over is possible even without there being matching H/W configurations. For example, with respect to the number of CPU cores, OS can handle a change in the number. Portions that do not require configuration matching are defined by the H/W configuration matching policy 165.

<Process Procedure>

Figure 2:
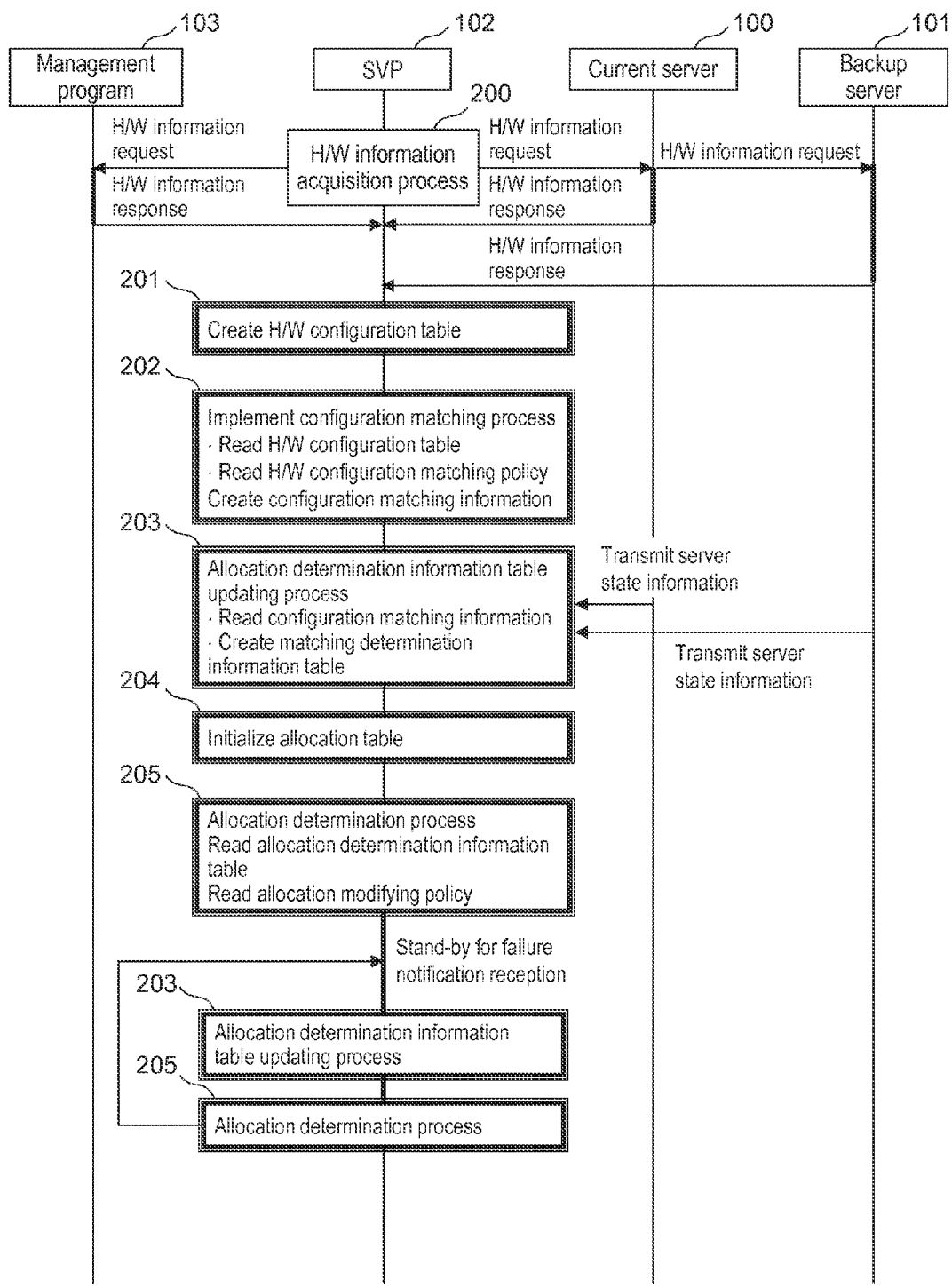
FIG. 2 is a diagram for describing a procedure for determining a take-over destination server when take-over function is activated.

FIG. 2 is a diagram for describing the procedure of a take-over destination server determination process that is executed when the take-over function is activated. The take-over destination server determination process (backup server allocation process) is executed before a failure develops in the current server. This is because, once a failure develops in the current server, it cannot be known how the current server will operate and therefore a backup server allocation determination cannot be correctly made. That is, if allocation is performed after the development of failure, a take-over may not be successfully performed.

The SVP 102 executes a process 200 of acquiring, using the H/W configuration acquisition control unit of the SVP 102, the H/W information of the current server 100 and the backup server 101 after the take-over function is activated. It should be noted that the current server 100 and the backup server 101 are not required to be housed in the same housing (i.e., the managing entity may not be the same SVP), and that the H/W information of the current server 100 and the backup server 101 in separate housings may be acquired through the management program 103. Therefore, a take-over can be implemented even if either the current server 100 or the backup server 101 is in a separate housing.

Based on the acquired H/W configuration information, the SVP10 executes a H/W configuration table creating process 201 using the H/W configuration acquisition control unit.

Then, the SVP 102, using the H/W configuration matching control unit 164, reads the H/W configuration table 165 and the H/W configuration matching policy 166, and creates (a configuration matching process 202: see FIG. 6 for details) information (configuration matching information) for matching the H/W configurations of the current server 100 and the backup server 101, which information is necessary for a backup server module concealment process. Herein, the module refers to computer H/W portions including but not limited to CPU, DIMM, and I/O, and the module is required to be concealable. More specifically, with reference to the H/W configuration matching policy 166 (FIG. 5), the configurations of the backup server and the current server of FIG. 4 are compared, by focusing on a H/W portion that requires matching configurations, to determine whether the configurations are matched.

Figure 8:
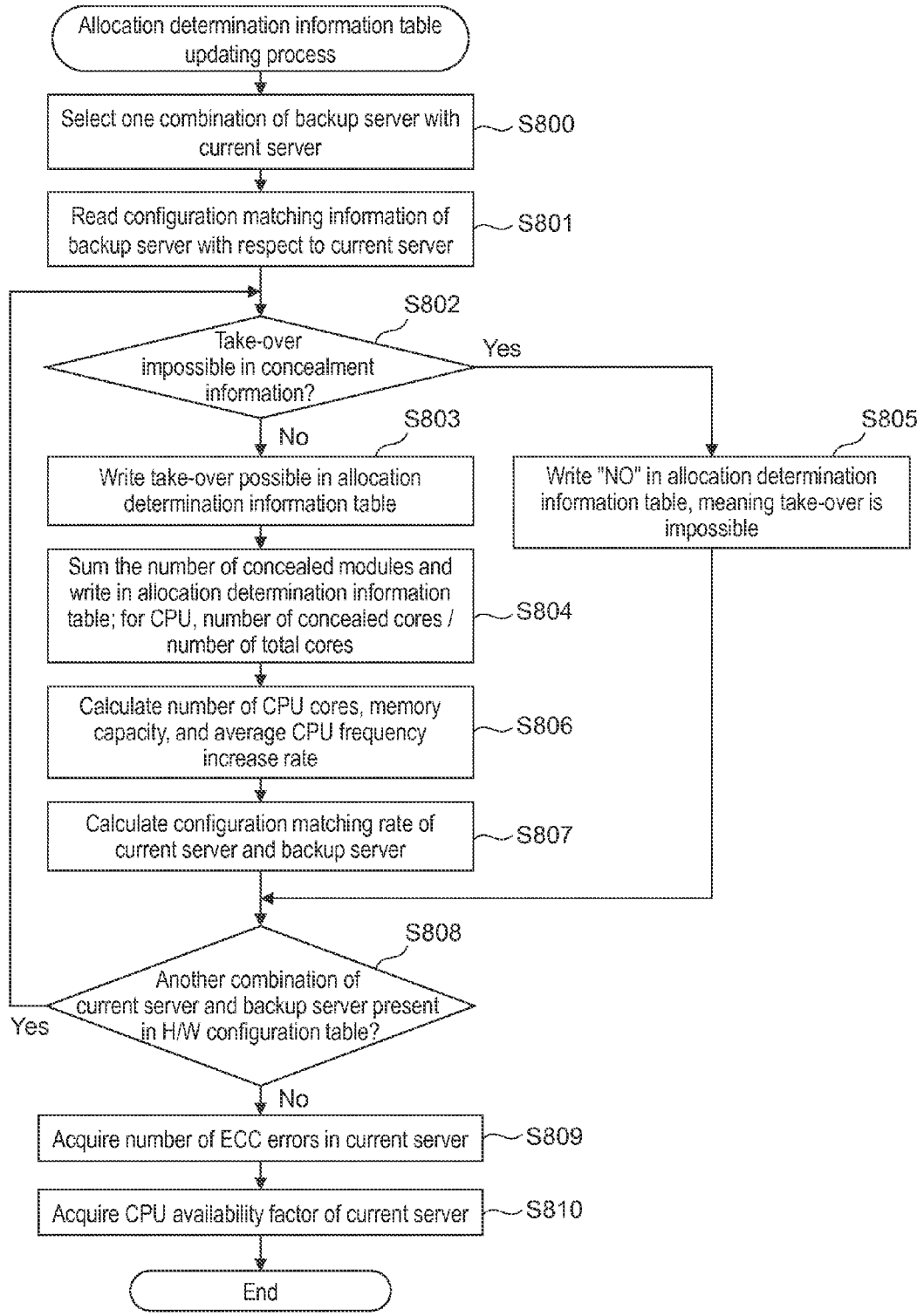
FIG. 8 is a flowchart for describing an allocation determination information table updating process.

The SVP 102 reads the server state information of the current server 100 and the backup server 101 and the configuration matching information 167, and executes a process (an allocation determination information table updating process 203: see FIG. 8 for details) for creating information as a reference for the determination as to which backup server 101 should be allocated to the current server 100. The server state information acquired from each server is additional information necessary for allocation determination, and includes information such as ECC error of DIMM or the CPU availability factor. If information of a separate housing is required, the information may be acquired via the management program 103.

Figure 12:
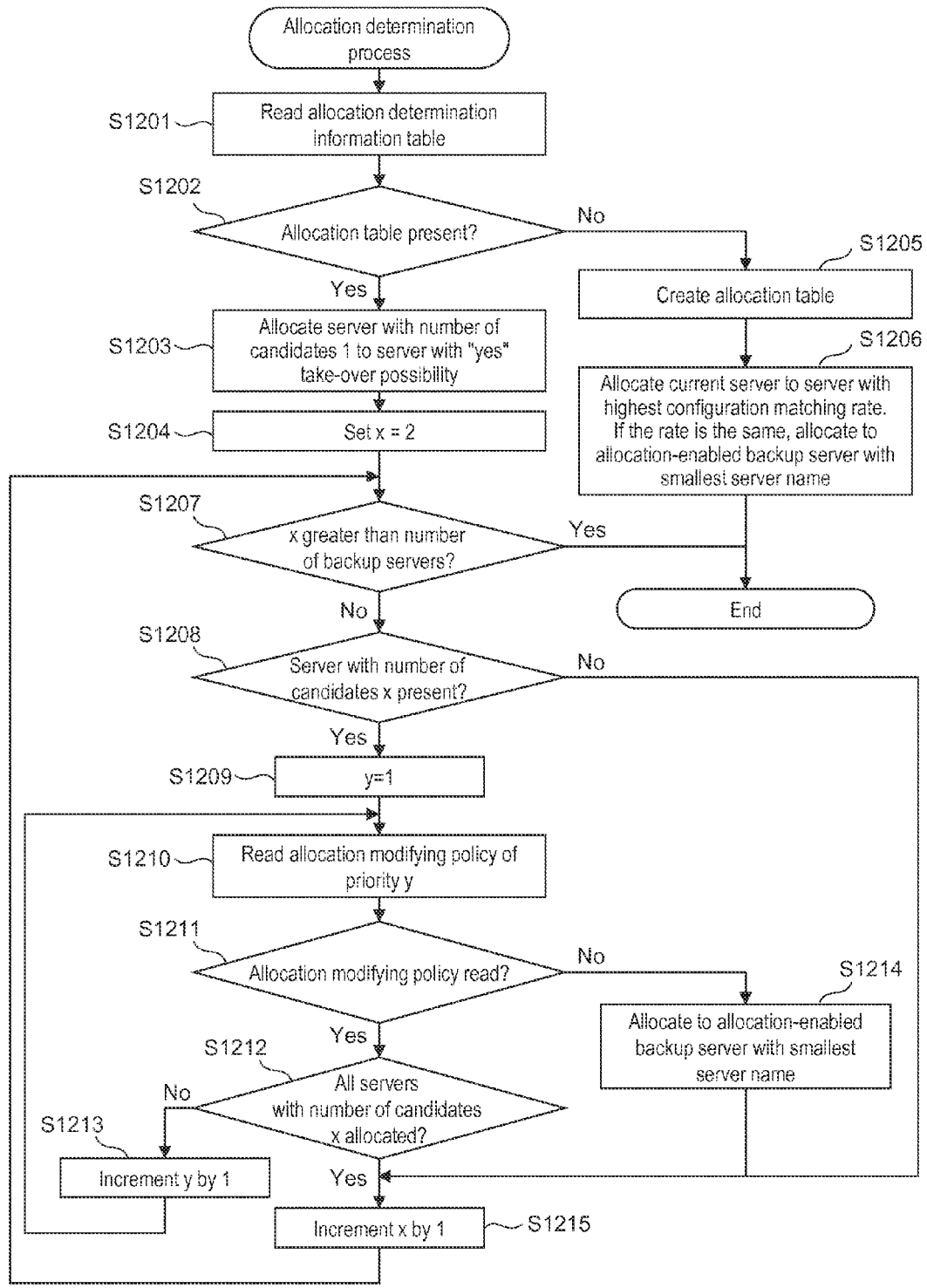
FIG. 12 is a flowchart for describing an allocation determination process.

Then, the SVP 102 executes an allocation table initializing process 204 (corresponding to the process of S1206 of FIG. 12). The allocation table (see FIG. 13 for the table at the time of initialization) includes information indicating beforehand by which backup server the current server is to be taken over. For the initial allocation, the allocation table initializing process 204 is executed.

The SVP 102 then reads the allocation determination information table (see FIG. 9) and the allocation modifying policy (see FIG. 10 or 11), and executes a process of determining to which backup server the current server is to be allocated (an allocation determination process 205, corresponding to the process of S1207 of FIG. 12). When the allocation determination process is executed, the SVP 102 enters a failure notification reception stand-by state.

The SVP 102 implements the allocation determination information table updating process 203 as needed (or regularly), and determines allocation in accordance with the server situation by implementing the allocation determination process 205 after the allocation information table is updated (see FIG. 14 or 15 for the updated table). The frequency of the updating depends on the weight of the process and may be at the rate of once per a predetermined time (such as one hour). The allocation determination information table is thus updated regularly because the risk of failure can be efficiently avoided by having the server experiencing an increase in ECC error (memory error) preferentially taken over by the backup server. That is, over the course of operation of the computer system 1, the ECC error and the like may vary compared with when allocated in the initial stage (at the time of allocation table initializing process), so that it is necessary to execute the allocation process better reflecting the current status.

<Server Switch Process>

FIG. 3 is a diagram for describing the procedure of a process of switching from the current server to the backup server in the event of failure.

When a H/W failure 300 develops in the current server 100, the current server 100 sends a failure log notification to the SVP 102. In response to the notification, the SVP 102 sends a failure notification to the management program 103.

The management program 103 has allocation information (allocation table information) for the current server 100 and the backup server 101, and sends a server switch request (N+M switch request) to the SVP 102 monitoring the current server 100 and the backup server 101 as the objects of concern. The allocation table (any of FIGS. 13 to 15) is created by the SVP 102, and acquired by the management program 103 as needed. Thus, the management program 103 can grasp the current server 100 and the backup server 101 as the objects of concern. While in the present embodiment, the allocation table is managed by the SVP 102, the allocation table may be possessed by either the SVP 102 or the management program 103. The allocation information may be transmitted from the management program 103 to the SVP 102 so that the allocation table can be managed by the management program 103.

Upon reception of the N+M switch request from the management program 103, the SVP 102 refers to the allocation table and transmits 301 configuration matching information to the BMC of the backup server as the take-over destination. The configuration matching information is BMC setting information indicating whether a specific module is to be concealed or not. The transmitted configuration matching information only includes the information about the current server and the backup server as the objects of concern. For example, when the current server having a failure is the server 3 and the backup server allocated as the take-over destination is the server 1, only the information about configuration matching of the server 1 and the server 3 (see FIG. 7) is transmitted.

The BMC 110 of the backup server 101 executes a H/W configuration concealment process 302 on the basis of the received configuration matching information. Execution of the concealment process 302 makes the H/W configuration of the backup server 101 matched with or able to take over the H/W configuration of the backup server 101.

After the H/W concealment process based on the configuration matching information, the backup server 101 notifies the SVP 102 of the end of the concealment process.

In response to the notification, the SVP 102 executes an N+M switch process 303 which is a switch process according to conventional technology.

In an example, the configuration matching information includes information indicating whether concealment of CPU socket, CPU core, DIMM, or I/O slot is to be implemented. In this case, if a setting for concealment is described in the item for the CPU socket 1 in the configuration matching information, the CPU concealment control unit of the BMC of the backup server of concern implements concealment of the CPU socket 1.

<H/W Configuration Table>

FIG. 4 shows a configuration example of the H/W configuration table 165 showing the H/W configuration of each server. The H/W configuration table provides concealable H/W configuration information.

The H/W configuration table 165 includes configuration items for server name 400, server use 401, module name 402, and mount information 403 indicating the mounting or non-mounting of each module.

The server name 400 indicates a server-specific identifier which may be provided by any unique identifier. The use 401 indicates whether the server is a current server performing an operation or a backup server. The module name 402 indicates H/W portions constituting the computer system that are concealable, and includes additional information of the modules. The mount information 403 indicates whether each module is mounted. The mount information also includes additional information of the modules providing material for configuration matching determination, such as CPU frequency and memory capacity.

<H/W Configuration Matching Policy>

FIG. 5 shows a configuration example of a H/W configuration matching policy table 166 indicating policies for matching H/W configurations.

The H/W configuration matching policy table 166 has the configuration items of current server name 500, module name 501, and policy 502.

The current server name 500 is a server-specific identifier and identical to the server name 400 of FIG. 4. The module name 501 is information indicating the H/W portion as the object of policy setting. The policy 502 is information defining the method of H/W configuration matching at the time of take-over.

In the present embodiment, the absence of module configuration matching is designated by "No concealment", while the presence of mount matching is designated by "Configuration matching". In an example of policy definition, "Configuration matching" is set for the case where a normal take-over requires the mounting of I/O slot, while "No concealment" is set for the case where a take-over can be normally performed even if the configuration is changed before and after the take-over of operation, such as in the case of CPU.

<H/W Configuration Matching Process>

Figure 6:
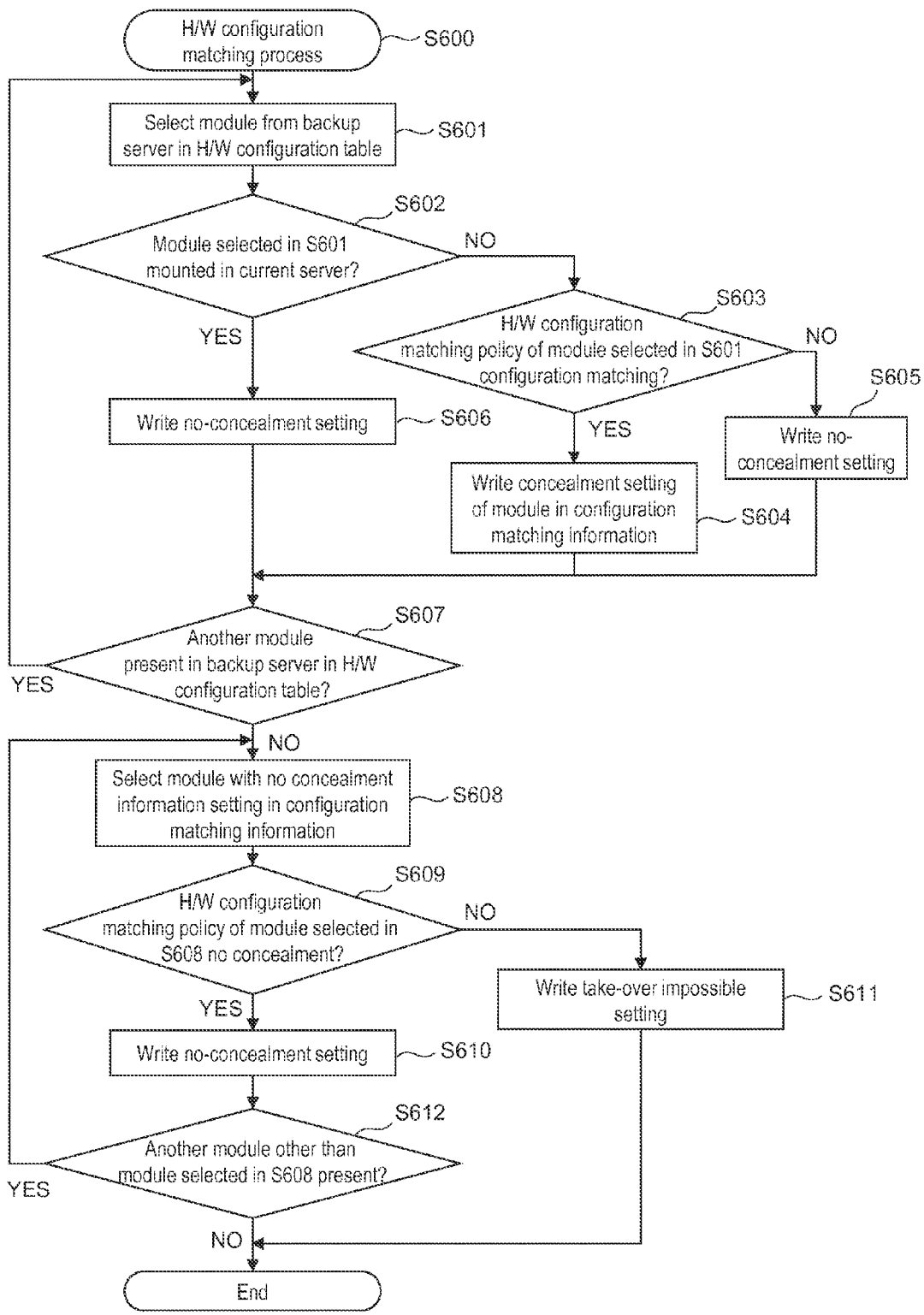
FIG. 6 is a flowchart for describing a H/W configuration matching process.

FIG. 6 is a flowchart for describing a process for determining the concealment module for 11/W configuration matching (a H/W configuration matching process).

The H/W configuration matching control unit (which may also be referred to as a "H/W configuration matching control program") 164 refers to the H/W configuration table of FIG. 4 to select one module from the backup server (S601).

The H/W configuration matching control unit 164 determines whether the module selected in S601 is mounted in the current server (S602). If the selected module is mounted, the process transitions to S605; if not mounted, the process transitions to S603.

If the selected module is not mounted, the H/W configuration matching control unit 164 determines whether the H/W matching policy in FIG. 5 indicates configuration matching (S603). If the policy is "Configuration matching", the H/W configuration matching control unit 164 writes the concealment setting of the selected module in the configuration matching information (S604). If the H/W configuration matching policy is not for configuration matching, the H/W configuration matching control unit 164 writes "No concealment" setting (S605).

On the other hand, if it is determined in S602 that the selected module is mounted, the H/W configuration matching control unit 164 writes "No concealment" setting because the configurations are matched (S606).

Thereafter, the H/W configuration matching control unit 164 determines whether there is another module in the backup server of the H/W configuration table 165 (S607). The process of S601 to S606 is repeated until all of the modules mounted in the backup server as the object of concern are processed. When the mounted module processing is completed, the process transitions to S608.

In S608, the H/W configuration matching control unit 164 selects a module having no setting in the concealment information of the configuration matching information table 167. That is, a module for which neither "No concealment" nor "Concealment" are set is selected. Because the process of S602 to S607 is implemented when there is a module that is only mounted in the current server, the presence of the module having no setting is possible.

The H/W configuration matching control unit 164 then determines whether the H/W configuration matching policy 166 for the module selected in S608 is "No concealment" (S609).

If the policy is "No concealment" ("Yes" in S609), the H/W configuration matching control unit 164 writes "No concealment" as the concealment information for the module of concern (S610).

If the policy is not "No concealment", i.e., if it is "Configuration matching" ("No" in S609), the H/W configuration matching control unit 164 writes a "Take-over impossible" setting as concealment information (S611). This is because configuration matching is impossible due to the absence of a module in the backup server.

The H/W configuration matching control unit 164 repeats the process of S608 to 612 until the setting is completed for the module having no concealment information setting.

<Configuration Matching Information Table>

FIG. 7 shows a configuration example of the configuration matching information table 167 indicating the concealment setting for H/W configuration matching. The configuration matching information table 167 includes information created as a result of the H/W configuration matching process of FIG. 6. The configuration matching information table 167 also manages information transmitted to the BMC of the backup server. Upon reception of the information, the BMC executes a module concealment process based on the concealment information.

The configuration matching information table 167 includes configuration items of current/backup 700, module name 702, and concealment information 702 to 705.

The current/backup 700 is information indicating combinations of the identifiers of the current server and the backup server, using the same identifiers as those for the server name 400 (see FIG. 4) and the current server 500 (see FIG. 5). The concealment information 702 to 705 is information indicating the respective module settings. "No concealment" in the concealment information means a setting for not concealing the backup server module. "Concealment" means a setting for concealing the backup server module. "Take-over impossible" means that a take-over is not possible due to the absence of configuration matching between the current server and the backup server.

<Allocation Determination Information Table Updating Process>

FIG. 8 is a flowchart for describing a process of acquiring information for determining to which backup server the current server should be allocated (an allocation determination information table updating process).

The SVP 102 initially selects one combination of a current server and a backup server for which the allocation determination information is acquired (S800), and reads the H/W configuration matching information table 167 (see FIG. 7) (S801). The sequence of the process of S800 and the process of S801 may be reversed.

The SVP 102, with respect to the selected combination of the current server and the backup server, determines if there is "Take-over impossible" in the concealment information in the H/W configuration matching information table 167 (S802). If "Take-over impossible" is not present ("No" in S802), the process transitions to S803; if "Take-over impossible" is present ("Yes" in S802), the process transitions to S805.

In S803, the SVP 102 writes "Yes" in the column for the take-over possibility 901 in the allocation determination information table (FIG. 9) (S803). The SVP 102 then finds a total of the number of the modules to be concealed, and writes the total value in the column for the number of concealed modules 904 in the allocation determination information table (S804). In the present embodiment, the value with respect to CPU is the number of cores concealed/the total number of cores, because it would not be appropriate to equate the concealment of a single core to the concealment of an entire single CPU. However, the method of finding the total number of concealed modules is not particularly limited.

On the other hand, in S805 (the process in the presence of "Take-over impossible"), the SVP 102 writes "No" in the column for the take-over possibility 901 in the allocation determine table, meaning that a take-over is impossible (S805).

Thereafter, the SVP 102 calculates an average CPU frequency increase rate 905, a CPU core number increase rate 906, and a memory capacity increase rate 907 in the case where the current server is taken over to the backup server (S806).

The SVP 102 also calculates a configuration matching rate of the combination of the current server and the backup server (S807). The modules considered when calculating the configuration matching rate are CPU socket, DIMM, and I/O slot. In the case of FIG. 4 for example, there are the CPU sockets 0, 1, 2, and 3; the DIMMs 0 and 1; and the I/O slots 0, 1, and 2, for a total of nine modules. The CPU core is not counted for the number of modules because it is considered to be included in the CPU socket. Configuration matching conditions include mount/non-mounting matching and matching in frequency and capacity between the current server and the backup server. With respect to CPU socket configuration matching, CPU core configuration matching is required (because the CPU core is thought to be reflected). Thus, in the example of FIG. 4, a formula for calculating the configuration matching rate is (the number of matching modules)/(the total number of modules=9).

The SVP 102 next determines if there is another combination of the current server and the backup server in the H/W configuration table 167 (S808). If there is another combination of the current server and the backup server ("Yes" in S808), the process of S802 to S807 is repeated until there is no more combination. If there is no combination of the current server and the backup server ("No" in S808), the process transitions to S809.

In S809, the SVP 102 acquires information about the number of ECC errors in the current server (S809). The SVP 102 also acquires information about a CPU availability factor of the current server (S810). These items of information are acquired by the SVP 102 sending a request to each current server for the current number of ECC errors and availability factor information.

<Allocation Determination Information Table>

FIG. 9 shows a configuration example of the allocation determination information table for managing the information about which backup server the current server is to be allocated to. The allocation determination information table and an allocation modifying policy which will be described later are used to determine the allocation of the backup server that should take over the current server.

The allocation determination information table includes the configuration items of the take-over possibility 901; yes-total 902 indicating the total of take-over "Yes"; the number of take-over destination candidates 903; the number of concealed modules 904; average CPU frequency increase rate 905; CPU core number increase rate 906; memory capacity increase rate 907; H/W configuration matching rate 908; the number of ECC errors 909; and availability factor 910.

The take-over possibility 901 is information indicating whether a H/W configuration can be taken over. The yes-total 902 is information indicating the number of current servers that can be taken over with reference to the backup server. The number of take-over destination candidates 903 is information indicating the number of backup servers that can take over with reference to the current server. The number of concealed modules 904 is information indicating the number of modules that are concealed at the time of a take-over. The average CPU frequency increase rate 905 is information indicating how much the CPU frequency increases after a take-over. The CPU core number increase rate 906 is information indicating how much the number of CPU cores increases after a take-over. The memory capacity increase rate 907 is information indicating how much the memory capacity increases after a take-over. The H/W configuration matching rate 908 is information indicating how much the configurations of the current server and the backup server are matched without concealment. The number of ECC errors 909 is information indicating the number of ECC errors in the DIMM, the information being used as an index for learning the possibility of DIMM failure. If the number of ECC errors is large, there is a high possibility that an operation take-over will be implemented. The CPU availability factor 910 is information indicating the utilization rate of CPU, which information is used as an index so that a backup server with higher performance can take over if the CPU utilization rate is high.

<Allocation Modifying Policy>

FIG. 10 and FIG. 11 show examples of the allocation modifying policy table 168 indicating current server allocation method policies. FIG. 10 and FIG. 11 show different policies.

The allocation modifying policy 168 has configuration items of priority 1000, policy 1001, and policy contents 1002 to 1005 or 1100 and 1101.

The priority 1000 is information indicating the execution priority order of the policy 1001. The policy 1001 is information indicating an allocation reference for the current server and the backup server. The policy content 1002 indicates the policy content with priority 1 in the policy table of FIG. 10. The policy content 1003 indicates the policy content with priority 2 in the policy table of FIG. 10. The policy content 1004 indicates the policy content with priority 3 in the policy table of FIG. 10. The policy content 1005 indicates the policy content with priority 4 in the policy table of FIG. 10. The policy content 1100 indicates the policy content with priority 1 in the policy table of FIG. 11. The policy content 1101 indicates the policy content with priority 2 in the policy table of FIG. 11.

Backup server allocation with respect to the current server is possible without providing the allocation modifying policy. However, if the backup server is allocated to the current server randomly without providing the modifying policy, backup server allocation may become disproportionate. For example, consider a case in which there is a backup server with a greater configuration than current servers, and a backup server with a smaller configuration than the current servers. If one current server were to be initially allocated to the backup server with the greater configuration, the remaining current servers would not be able to be allocated to the backup server because the configuration of the backup server as the remaining allocation destination is smaller than the current servers. Accordingly, by having a small-configuration current server be taken over by the small-configuration backup server and a large-configuration current server by the large-configuration backup server, the resources can be more efficiently utilized. Thus, in order to achieve an increase in backup server allocation efficiency, the allocation modifying policy is beneficial.

<Allocation Determination Process>

FIG. 12 is a flowchart for describing the allocation determination process of determining which backup server the current server is to be allocated to.

First, the SVP 102 reads the allocation determination information table (FIG. 9) (S1201), and determines whether there is an already-created allocation table (such as FIGS. 13 to 15) (S1202). If there is no such allocation table ("No" in S1202), the process transitions to S1205. If there is such allocation table ("Yes" in S1202), the process transitions to S1203.

In S1205, the SVP 102 creates an allocation table (corresponding to the allocation table initializing process 204 (see FIG. 2)).

The SVP 102 then allocates the current server to a backup server with the highest configuration matching rate (S1206). If the configuration matching rates are the same, the current server is allocated to an allocation-enabled backup server with the smallest backup server identifier. The smallest identifier is not a requirement, and it is only required that there be a server allocation reference for the case of the same configuration matching rates. S1206 is a process that is only executed for the initial allocation process.

On the other hand, in S1203, the SVP 102 refers to the allocation determination information table (FIG. 9) and allocates the server with the number of candidates "1" to the server with the possibility of a take-over "Yes" (S1203). The allocation designation is necessarily determined for the server with the number of candidates 1 for there is only one take-over destination for that server.

Then, the SVP 102 sets the number of candidates X to 2 so as to perform allocation for the servers for which the number of candidates is 2 (S1204).

The SVP 102 then determines whether X is greater than the number of the backup servers (S1207). If X is a value greater than the backup servers ("Yes" in S1207), the process ends. If X is not greater than the number of the backup servers ("No" in S1207), the process transitions to S1208.

In S1208, the SVP 102 determines whether there is a backup server having the value of the number of candidates X (S1208). If there is such backup server ("Yes" in S1208), the process transitions to S1209; if there is no such backup server ("No" in S1208), the process transitions to S1215.

In S1209, the SVP 102 sets priority y=1 (S1209). The SVP 102 then refers to the allocation modifying policy (see FIG. 10 or 11), and reads the allocation modifying policy with priority y=1 (S1210).

The SVP 102 then determines whether the allocation modifying policy has been read (S1211). If not ("No" in S1211), the process transitions to S1215. If it has been read ("Yes" in S1211), the process transitions to S1212. When priority y=1, the allocation modifying policy can be read, so that the process transitions to S1212.

If the allocation modifying policy cannot be read ("No" in S1211), the SVP 102 in S1215 cannot determine the condition for taking-over in accordance with the allocation method of the allocation modifying policy. Thus, the SVP 102 allocates to an allocation-enabled backup server having the smallest identifier (backup server number (backup server name)) (S1214). The process then transitions to S1215, and the process of S1207 and thereafter is repeated by incrementing the number of candidates X by one. With respect to the process of S1214, while the identifier is not necessarily required to be the smallest, the condition must be satisfied that the current server can be allocated to a backup server without fail.

If the allocation modifying policy has been read ("Yes" in S1211), the SVP 102 in S1212 determines whether all of the current servers having the number of candidates X have been allocated to the backup servers (i.e., whether they can be taken over) (S1212). If allocated ("Yes" in S1212), the process transitions to S1215, the number of candidates X is incremented by one, and the process of S1207 and thereafter is repeated. If not allocated ("No" in S1212), the process transitions to S213.

In S1213, the SVP 102 selects the next priority (i.e., priority (y+1), where y is the previous priority), and then the process of S1210 and thereafter is repeated for the priority (y+1). In this way, by the process of S1210 to S1213, the allocation modifying policy is read in the order of decreasing priority y, and the backup servers are allocated to the current servers with the number of candidates X (all current servers). When the number of candidates X is greater than the number of the backup servers ("Yes" in S1207), the process ends.

<Allocation Result>

FIGS. 13 to 15 show configuration examples of the allocation table for managing the information about which backup server the current server is to be allocated to. The information in the allocation table may take variable values depending on the allocation timing, the allocation determination information table of FIG. 9, and the state of the allocation modifying policy 168 of FIGS. 10 and 11.

The allocation table includes, as configuration information, allocation 1300 indicating information of the backup server as an allocation destination; information of the backup server allocated to the current server; ECC error total 1301; and the number of allocated servers 1302. The ECC error total 1301 is information indicating the total number of ECC errors in the current server allocated to the backup server. The number of allocated servers 1302 is information indicating the number of the current servers allocated to the backup server. FIG. 13 shows the result of an initial allocation process (the result of S1206). FIG. 14 shows the result of an allocation updating process according to the allocation modifying policy of FIG. 10 (the result of S1202 to S1215). FIG. 15 shows the result of an allocation updating process according to the allocation modifying policy of FIG. 11 (the result of S1202 to S1215).

(i) FIG. 13 (Result of the Initial Allocation Process)

In the initial allocation of FIG. 13, the current servers are allocated to the servers with the highest configuration matching rate 908 in the allocation determination information table of FIG. 9. With respect to the current server 3, the configuration matching rate of the backup server 1 is 66 while the configuration matching rate of the backup server 2 is 44. Thus, the take-over destination of the current server 3 is the backup server 1. A similar process is performed with respect to the current servers 4, 5, 6, and 7 so as to allocate the backup servers.

(ii) FIG. 14 (Result of the Allocation Updating Process Based on the Allocation Modifying Policy of FIG. 10)

FIG. 14 shows the result of the allocation process using the allocation modifying policy of FIG. 10.

In the allocation modifying process (allocation updating process) of FIG. 10, first, the current server 6 is allocated to the backup server 2 because the current server has only one take-over destination. Then, with respect to the current servers 3, 4, 5, and 7, the policy 1002 with the priority 1 in the allocation modifying policy of FIG. 10 is executed. The servers with the number of ECC errors exceeding 50 correspond to the current servers 5 and 7 in view of the number of ECC errors 909 in the allocation determine table of FIG. 9. Further, because the value of the number of ECC errors is greater for the current server 7, the allocation process is executed for that server before the current server 5. With respect to the policy 1002 (1), because the total number of ECC errors 1301 is 0 when the current server 7 as the take-over source is allocated, (2) is executed. Because the "yes-total" 902 of the take-over destination candidates in FIG. 9 is smaller for the backup server 1, the current server 7 is allocated to the backup server 1.

Next, (1) is executed with respect to the current server 5. The current server 7 is already allocated, the total number of ECC errors 1301 for the backup server 1 is 80, and the ECC error total 1301 for the backup server 2 is zero. Thus, the current server 5 is allocated to the backup server 2 with the smaller total number of ECC errors 1301. Because there is no more servers with the number of ECC errors exceeding 50, the allocation process based on the policy 1002 ends.

Then, the policy 1003 is implemented. The server with the availability factor 910 in FIG. 9 exceeding 90% corresponds to the current server 3. The current server 3 is allocated to the backup server with the CPU core number increase rate of 2.0 or more. This condition is satisfied when allocated to the backup server 2. Thus, the current server 3 is allocated to the backup server 2.

The policy 1004 is then implemented. The object of the allocation process is the current server 4. The CPU core number increase rate 906 for the current server 4 in FIG. 9 is the same in the backup servers 1 and 2. Accordingly, no allocation can be determined even if the policy 1004 is used. Thus, the implementation of the policy 1004 ends.

With respect to the policy 1005, allocation is determined by the number of concealed modules. However, the number of concealed modules for the current server 4 in FIG. 9 is the same in the backup servers 1 and 2. Thus, the allocation cannot be determined, so that the implementation of the policy 1005 ends.

When all of the policies have been read and there is no more policies to read, the process of 1214 in FIG. 12 is executed, whereby allocation is made to the backup server with the smallest server name (backup server number). Thus, the current server 4 is allocated to the backup server 1.

Thus, the allocation for all of the current servers is completed, and the result is as shown in FIG. 14.

(iii) FIG. 15 (Result of the Allocation Updating Process Based on the Allocation Modifying Policy of FIG. 11)

FIG. 15 shows the result of the allocation process using the allocation modifying policy of FIG. 11.

In the allocation modifying process (allocation updating process) of FIG. 11, the current server 6 is allocated to the backup server 1 because there is only one take-over destination for the current server. Thereafter, the policy 1100 with priority 1 in the allocation modifying policy of FIG. 11 is implemented. The present process is similar to the case of FIG. 14 and will not be described in detail.

Then, the policy 1101 is implemented. The object of the process is the current servers 3 and 4, and (1) is implemented, whereby the allocation is made to the backup server with the smallest number of allocated servers 1302. Because the number of allocated servers is one for the backup server 1 and two for the backup server 2, the current server 3 is allocated to the backup server 1.

Then, allocation of the current server 4 is executed. As a result of the allocation of the current server 3, the number of allocated servers is the same rate for the backup servers 1 and 2, the process (2) is executed. According to (2), allocation is made to the backup server with the smallest total number of ECC errors 1301. Thus, the current server 4 is allocated to the backup server 2.

Thus, the allocation of all of the current servers is completed, and the result is as shown in FIG. 15.

<Conclusion>

(i) According to an embodiment of the present invention, hardware configurations are compared for each of the combinations of the current servers and the backup server, and, with reference to the hardware configuration matching policy information, the presence or absence of hardware configuration concealment and the possibility of a take-over are determined for each of the combinations of the current server and the backup server. Further, with respect to each of the combinations of the current server and the backup server, the configuration matching rate indicating the ratio of hardware configuration matching is calculated. Then, based on the information about the presence or absence of hardware configuration concealment, the information about the possibility of a take-over, and the information about the configuration matching rate with respect to each of the combinations of the current servers and the backup server, allocation of the backup server as a take-over destination for the current server is made. In this way, even when the current server and the backup server have different H/W configurations, it becomes possible to determine the backup server as the take-over destination that is capable of taking over an operation without an influence on the OS. It also becomes possible to expect the effect that no I/O recognizing work will be required on the OS after switching, and that there will be no licensing restrictions in conjunction with the CPU socket/core. Furthermore, the program running on the OS will not be subject to the licensing restrictions. Thus, by efficiently utilizing the H/W resources and maintaining a number of servers that can take over, an increase in availability can be achieved, and by making the server allocation determination preferentially for a server that is apt to fail, an increase in availability can be achieved.

If any of the current servers fails, the information about the presence or absence of hardware concealment is transmitted to the backup server allocated as the take-over destination for the current server. The backup server, based on the information about the presence or absence of hardware concealment, executes a hardware concealment process, and transmits a concealment process completion notification to the SVP (local management computer). The SVP then executes the process of switching the current server experiencing failure to the backup server allocated as the take-over destination. In this way, even when the current server and the backup server have different H/W configurations, operation can be taken over from the current server experiencing failure to the backup server while H/W resources are efficiently utilized.

According to the present embodiment, the allocation of the take-over destination backup server that has been determined is dynamically modified (updated). For example, based on the number of ECC errors in the current server, the backup server allocation that has already been executed is modified. Alternatively, in addition to the number of ECC errors, information about the CPU availability factor of the current server and information about the CPU core number increase rate in each of the combinations of the current server and the backup server are used to dynamically modify the backup server allocation. In this case, a policy for the allocation modifying process may be specified in advance. The modifying policy may specify a backup server allocation condition based on the number of ECC errors; a backup server allocation condition based on the number of ECC errors; a backup server allocation condition based on the CPU availability factor; and a backup server allocation condition based on the CPU core number increase rate, for example. When a plurality of conditions are included in the policy, a priority setting may be made indicating the order of consideration of the respective conditions. In this way, compared with when the take-over destination is determined through simple consideration of only a configuration difference between the current server and the backup server, disproportional allocation of the backup servers can be prevented. For example, consider a case where there are a backup server with a configuration greater than those of current servers and a backup server with a configuration smaller than those of the current servers. If one current server were to be allocated to the greater-configuration backup server, it would become impossible to allocate the remaining current servers to any backup server because the configuration of the backup server as the remaining allocation destination is smaller than the configurations of the current servers. Accordingly, efficient utilization of resources can be achieved by having the smaller-configuration current server be taken over by the smaller-configuration backup server and the larger-configuration current server by the greater-configuration backup server. In order to achieve such an increase in backup server allocation efficiency, providing an allocation modifying policy is beneficial.

In the present embodiment, the SVP, the current server, and the backup server included in one chassis are considered to constitute a single server system (blade server). In an actual system (computer system), a plurality of such server systems may be provided. In order to manage a plurality of such server systems, the global management computer including a management program is provided. The global management computer manages communications between the SVPs (local management computers) in the plurality of server systems. In a basic server take-over destination determination process (backup server allocation process), first the backup server in the same chassis may be considered as a candidate. However, the backup server housed in a different chassis (server system) may be considered as a candidate. For this purpose, via the global management computer, the respective SVPs acquire hardware configuration information of the current servers and the backup servers located in the different server systems. Each SVP then allocates, as the take-over destination for the current server in the server system of the SVP, the backup server in a server system different from the server system of the SVP. In this way, even in the absence of an appropriate backup server as the take-over destination in the same server system (chassis), the backup server in another server system can be used for a take-over, whereby the hardware resources can be more efficiently utilized.

(ii) The present invention may be implemented using a program code of software for performing the functions of the embodiment. In this case, a system or device may be provided with a storage medium having the program code recorded therein, and a computer (or CPU or MPU) in the system or device may read the program code stored in the storage medium. In this case, the program code per se read from the storage medium implements the functions of the embodiment, and the program code per se and the storage medium having the code stored therein constitute the present invention. Examples of the storage medium for supplying the program code include a flexible disc, a CD-ROM, a DVD-ROM, a hard disk, an optical disk, a magneto-optical disk, a CD-R, magnetic tape, a non-volatile memory card, and a ROM.

Based on program code instructions, an actual process may be partly or entirely performed by the OS (operating system) and the like running on the computer, and the functions of the embodiments may be implemented by the process. Further, after the program code read from the storage medium is written to a memory on the computer, an actual process may be partly or entirely performed by the CPU and the like of the computer on the basis of the program code instructions, and the functions of the embodiments may be implemented by the process.

Further, the software program code for implementing the functions of the embodiments may be delivered via a network and stored in a storage means of the system or device, such as a hard disk or a memory, or in a storage medium such as a CD-RW or a CD-R. The program code stored in the storage means or the storage medium may be read and executed as needed by the computer (or CPU or MPU) of the system or device.

Finally, it should be understood that the processes and technologies described herein are essentially not related to any specific device and may be implemented by any appropriate combination of components. Various types of devices for general use may be used in accordance with the teachings described herein. It may become apparent that, in order to execute the method steps described herein, it is beneficial to construct a dedicated device. Various inventions may be formed by appropriate combinations of the plurality of configuration elements disclosed in the embodiments. For example, some elements may be deleted from the entire constituent elements described in an embodiment. Constituent elements from across different embodiments may be combined as needed. While the present invention has been described with reference to specific examples, these are illustrative in all aspects and not restrictive. It will be apparent to those skilled in the art that there is a number of combinations of hardware, software, and firmware suitable for implementing the present invention. For example, the software that has been described may be implemented by a wide array of programs or script languages, such as an assembler, C/C++, perl, Shell, PHP, and Java (registered trademark).

In the foregoing embodiments, control lines and information lines are those considered necessary for illustrative purpose and do not necessarily correspond to the control lines and information lines found in a product. All of the configurations may be mutually connected.

REFERENCE SIGNS LIST

100 Current server
101 Backup server
102 SVP (Service Processor)
103 Management program
110 BMC (Baseboard Management Controller)
111 CPU concealment control unit
112 DIMM concealment control unit
113 I/O concealment control unit
120-121 CPU socket
130-131 CPU core 140 DIMM
150 I/O slot
160 N+M control unit
161 Conf acquisition control unit
162 Take-over control unit
163 H/W configuration acquisition control unit
164 H/W configuration matching control unit
165 H/W configuration table
166 H/W configuration matching policy
167 Configuration matching information table
168 Allocation modifying policy

The invention claimed is:

1. A server system comprising:
at least one current server processing an operation;
at least one backup server prepared to take over the operation of the current server when the current server fails; and
a local management computer that monitors the current server and the backup server and controls server switching,
the local management computer includes:
a processor that executes a process of allocating the backup server as a take-over destination for the operation of the current server, and
a memory that stores at least hardware configuration matching policy information indicating a hardware configuration condition enabling a server take-over,
the processor configured to execute:
a process of acquiring hardware configuration information from each of the current server and the backup server,
a process of making a hardware configuration comparison based on the acquired hardware configuration information with respect to each combination of the current server and the backup server, and determining a presence or absence of hardware configuration concealment and the possibility of a take-over with respect to each combination of the current server and the backup server by referring to the hardware configuration matching policy information read from the memory,
a process of calculating a configuration matching rate indicating the ratio of hardware configuration matching with respect to each combination of the current server and the backup server, and
a process of allocating the backup server as the take-over destination of the current server on the basis of information about the presence or absence of hardware configuration concealment, information about the possibility of a take-over, and information about the configuration matching rate with respect to each combination of the current server and the backup server.

2. The server system according to claim 1, wherein the processor further executes:
a process of acquiring information about the number of ECC errors in the current server, and
a process of modifying, based on the acquired number of ECC errors, the backup server allocation that has been executed, and dynamically allocating the backup server to the current server.

3. The server system according to claim 2, wherein the processor further executes:
a process of acquiring information about a CPU availability factor of the current server, and information about a CPU core number increase rate in each of the combinations of the current server and the backup server, and
a process of dynamically allocating the backup server to the current server using the CPU availability factor and the information about the CPU core number increase rate in addition to the number of ECC errors.

4. The server system according to claim 3, wherein
the memory further stores allocation modifying policy information specifying a backup server allocation condition based on the number of ECC errors, a backup server allocation condition based on the CPU availability factor, and a backup server allocation condition based on the CPU core number increase rate,
each of the allocation conditions in the allocation modifying policy information having an consideration priority setting, and
the processor reads the allocation modifying policy information from the memory, considers the allocation modifying policy information according to the consideration priority, and executes the process of dynamically allocating the backup server to the current server.

5. The server system according to claim 2, wherein
the memory further stores allocation modifying policy information specifying a backup server allocation condition based on at least the number of ECC errors, and
the processor reads the allocation modifying policy information from the memory, and executes the process of dynamically allocating the backup server to the current server.

6. The server system according to claim 1, wherein the processor further executes:
a process of executing, in response to a failure notification with respect to any of the current servers, the information about the presence or absence of hardware concealment process to the backup server allocated as the take-over destination of the current server experiencing failure,
a process of receiving from the backup server a completion notification of a hardware concealment process executed based on the information about the presence or absence of hardware concealment, and
a process of switching the current server experiencing failure to the backup server allocated as the take-over destination.

7. A computer system comprising:
a plurality of the server systems according to claim 1; and
a global management computer that manages the plurality of server systems,
wherein
the global management computer enables, by managing communication between the local management computers in the plurality of server systems, each local management computers to acquire hardware configuration information about the current servers and the backup servers disposed in different server systems, and
the local management computer allocates the backup server in a server system different from the server system of the local management computer as the take-over destination of the current server in the server system of the local management computer.

8. A method of managing a server system including at least one current server processing an operation, at least one backup server prepared to take over the operation of the current server when the current server fails, and a local management computer that monitors the current server and the backup server and that controls server switching,
the local management computer including a processor that executes a process of allocating the backup server as a take-over destination for the operation of the current server, and a memory that stores at least hardware configuration matching policy information indicating a hardware configuration condition enabling a server take-over, the managing method comprising:

a step of the processor acquiring the hardware configuration information from each of the current server and the backup server;

a step of the processor making a hardware configuration comparison based on the acquired hardware configuration information with respect to each combination of the current server and the backup server, and, by referring to the hardware configuration matching policy information read from the memory, determining the presence or absence of hardware configuration concealment and the possibility of a take-over with respect to each combination of the current server and the backup server;

a step of the processor calculating a configuration matching rate indicating a ratio of hardware configuration matching with respect to each combination of the current server and the backup server; and a process of the processor allocating the backup server as a take-over destination of the current server with respect to each combination of the current server and the backup server, on the basis of information about the presence or absence of hardware configuration concealment, information about the possibility of a take-over, and information about the configuration matching rate.

9. The server system managing method according to claim 8, further comprising:

a step of the processor acquiring information about the number of ECC errors in the current server; and a step of the processor modifying an executed backup server allocation on the basis of the acquired number of ECC errors, and dynamically allocating the backup server to the current server.

10. The server system managing method according to claim 9, further comprising:

a step of the processor acquiring information about a CPU availability factor of the current server, and information about a CPU core number increase rate in each of the combinations of the current server and the backup server; and a step of the processor dynamically allocating the backup server to the current server using the CPU availability factor and the information about the CPU core number increase rate in addition to the number of ECC errors.

11. The server system managing method according to claim 10, wherein the memory further stores allocation modifying policy information specifying a backup server allocation condition based on the number of ECC errors, a backup server allocation condition based on the CPU availability factor, and a backup server allocation condition based on the CPU core number increase rate, each of the allocation conditions in the allocation modifying policy information having a consideration priority setting, and in the step of dynamically allocating the backup server to the current server, the processor reads the allocation modifying policy information from the memory, considers the allocation modifying policy information according to the consideration priority, and dynamically allocates the backup server to the current server.

12. The server system managing method according to claim 9, wherein the memory further stores allocation modifying policy information specifying a backup server allocation condition based on at least the number of ECC errors, and in the step of dynamically allocating the backup server to the current server, the processor reads the allocation modifying policy information from the memory, and dynamically allocates the backup server to the current server.

13. The server system managing method according to claim 8, further comprising:

a step of the processor, in response to a failure notification with respect to any of the current servers, transmitting the information about the presence or absence of hardware concealment to the backup server allocated as the take-over destination of the current server experiencing failure;

a step of the backup server allocated as the take-over destination executing a hardware concealment process based on the information about the presence or absence of hardware concealment;

a step of the processor receiving a concealment process completion notification from the backup server; and a process of the processor switching the current server experiencing failure to the backup server allocated as the take-over destination.

14. A computer-readable storage medium having stored therein a program for causing a processor of a local management computer in a server system, which includes at least one current server processing an operation, at least one backup server prepared to take over the operation of the current server when the current server fails, and the local management computer that monitors the current server and the backup server and controls server switching, to execute a process of allocating the backup server as a take-over destination for the operation of the current server, wherein the program includes a program code for causing the processor to execute:

a process of acquiring hardware configuration information from each of the current server and the backup server;

a process of making a hardware configuration comparison based on the acquired hardware configuration information with respect to each combination of the current server and the backup server, and, by referring to hardware configuration matching policy information read from a memory storing at least hardware configuration matching policy information indicating a hardware configuration condition enabling a server take-over, determining, with respect to each combination of the current server and the backup server, the presence or absence of hardware configuration concealment and the possibility of a take-over;

a process of calculating a configuration matching rate indicating a ratio of hardware configuration matching with respect to each combination of the current server and the backup server; and a process of allocating the backup server as the take-over destination of the current server on the basis of information about the presence or absence of hardware configuration concealment, information about the possibility of a take-over, and information about the configuration matching rate with respect to each combination of the current server and the backup server.

* * * * *